United States Patent [19]
Sugano et al.

[11] Patent Number: 5,090,950
[45] Date of Patent: Feb. 25, 1992

[54] AUTOMATIC POWER TRANSMISSION WITH SUBSIDIARY TRANSMISSION UNIT

[75] Inventors: Taku Sugano, Shizuoaka; Kazuyoshi Iwanaga; Noboru Hattori, both of Kanagawa, all of Japan

[73] Assignees: Nissan Motor Company, Ltd.; Jatco Corporation, both of Japan

[21] Appl. No.: 456,179

[22] Filed: Dec. 26, 1989

[30] Foreign Application Priority Data

Dec. 26, 1988 [JP] Japan .................. 63-330493

[51] Int. Cl.$^5$ ............................................ F16H 57/02
[52] U.S. Cl. ........................... 475/129; 74/606 R
[58] Field of Search ............. 475/127, 129; 74/606 R

[56] References Cited

U.S. PATENT DOCUMENTS

| | | | |
|---|---|---|---|
| 4,499,789 | 2/1985 | Karamochi et al. | 475/129 |
| 4,680,992 | 7/1987 | Hayasaki et al. | 74/869 |
| 4,688,449 | 8/1987 | Harada et al. | 475/129 |
| 4,730,521 | 3/1988 | Hayasaki et al. | 74/867 |
| 4,738,159 | 4/1988 | Kato et al. | 74/606 R |
| 4,748,809 | 6/1988 | Sumiya et al. | 60/415 |
| 4,779,492 | 10/1988 | Yasue et al. | 475/127 X |
| 4,823,637 | 4/1989 | Taguchi et al. | 74/606 R |
| 4,901,605 | 2/1990 | Taguchi et al. | 74/606 R |

FOREIGN PATENT DOCUMENTS

| | | |
|---|---|---|
| 0096114 | 12/1983 | European Pat. Off. |
| 58-211920 | 6/1983 | Japan |
| 6262047 | 5/1985 | Japan |

OTHER PUBLICATIONS

"Nissan Full-Range Electronically Controlled Automatic Transmission Service Manual", 1987.
Service Manual No. 626 (YAI-3, YA1B) "Nissan Cedric, Gloria, Introduction to Modification of Y31 Type Series", issued Jun. 1989 by Nissan Motor Co., Ltd.

Primary Examiner—Dwight Diehl
Attorney, Agent, or Firm—Ronald P. Kananen

[57] ABSTRACT

An automatic power transmission includes a primary transmission unit having plurality of gear elements for establishing predetermined speed ratios and a subsidiary transmission unit having an under-drive gear element for establishing at least one and a direct drive. Each gear element is associated with a friction element which controls associated one of the gear element for establishing one of a plurality of predetermined speed ratios. The friction element is connected to a hydraulic circuit which controls position of the friction element between engaged position and released position for establishing the one of speed ratios. The hydraulic circuit comprises a primary hydraulic unit mounted on a primary transmission casing and housing a plurality of control valves for variation pressure supply for respective friction elements, the primary hydraulic unit, and a subsidiary hydraulic unit mounted on a subsidiary transmission casing and including a pressure accumulator, a flow restriction orifice and an one-way check valve.

4 Claims, 7 Drawing Sheets

FIG. 4

| | REV/C | H/C | FWD/C | OVR/C | L&R/B | LOW O.W.C.O.W.C | FWD O.W.C | B/B | D/C | RDCN /B | RDCN O.W.C | S/A | S/R | OD S/A |
|---|---|---|---|---|---|---|---|---|---|---|---|---|---|---|
| 1ST | | | ○ | ⊗ | ○ | ▨ | ▨ | | | ○ | ▨ | | | |
| 2ND | | ○ | ○ | ◎ | | | ▨ | ○ | | ○ | ▨ | ○ | ○ | |
| 3RD | | ○ | ○ | ◎ | | | ▨ | | ○ | ○ | ▨ | ⊗ | ○ | |
| 4TH | | ○ | ○ | ◎ | | | ▨ | ○ | ○ | | | ⊗ | ⊗ | |
| 5TH | | | ⊗ | | | | | | | | | ⊗ | ⊗ | ○ |
| REV | ○ | | | | ○ | | | | | ○ | | | | |

○ : ENGAGED

◎ : TO BE ENGAGED AT LESS THAN OR EQUAL TO 1/16 OF THROTTLE OPEN ANGLE FOR ENGINE BRAKING

▨ : EFFECTIVE DURING ACCELERATION

⊗ : NOT EFFECTIVE THOUGH ENGAGED

⊗ : TO BE ENGAGED AT LESS THAN OR EQUAL TO 1/16 OF THROTTLE OPEN ANGLE BUT NOT EFFECTIVE FOR ENGINE BRAKING

AUTOMATIC POWER TRANSMISSION WITH SUBSIDIARY TRANSMISSION UNIT

BACKGROUND OF THE INVENTION

1. Field of the Invention

The present invention relates generally to an automatic power transmission for an automotive vehicle. More particularly, the invention relates to an automatic power transmission with a subsidiary transmission unit.

2. Description of the Background Art

Japanese Patent First (unexamined) Publication (Tokkai) Showa 58-211920 discloses an automatic power transmission with a subsidiary transmission unit. The disclosed transmission has a primary pressure accumulator for a primary transmission unit mounted on a primary transmission casing and a subsidiary pressure accumulator unit for the subsidiary transmission unit for over-drive speed ratio, mounted on a subsidiary transmission casing. In such prior proposed layout, the subsidiary pressure accumulator is connected to a flow restriction orifice and an one-way check valve so as to assure providing pressure variation characteristics with a predetermined pressure range in which the fluid pressure to be supplied to a friction element in the subsidiary transmission unit increases at smaller rate than that in the other ranges. In the prior proposed construction, the flow restriction orifice and the one-way check valve are provided in a hydraulic control unit which is mounted on the primary transmission casing. Therefore, a long fluid path is needed for connecting the subsidiary pressure accumulator in the subsidiary transmission unit to the flow restriction orifice and the one-way check valve in the hydraulic control unit on the primary transmission casing. Such a fluid path extends both through the primary and the subsidiary transmission casings and has to be connected in a liquid tight fashion at the interface between the primary and subsidiary transmission casings.

This makes the fluid path structure in the transmission casings complicated, causing difficulty in designing. As well, because of the length of the fluid path, a delay in response in the friction element provided in the subsidiary transmission unit is necessarily caused.

SUMMARY OF THE INVENTION

Therefore, it is an object of the present invention to provide an automatic power transmission with a subsidiary transmission unit, which has an improved layout of hydraulic elements.

Another and more specific object of the invention is to provide an automatic power transmission with a subsidiary transmission unit, with a simplified hydraulic circuit construction.

In order to accomplish aforementioned and other objects, an automatic power transmission including a primary transmission unit having plurality of gear elements for establishing predetermined speed ratios and a subsidiary transmission unit having at least one gear element for establishing at least one predetermined speed ratio, each gear element being associated with a friction element which controls an associated one of the gear elements for establishing one of a plurality of predetermined speed ratios, the friction element being connected to a hydraulic circuit which controls the position of the friction element between an engaged position and a released position for establishing the one of the speed ratios, the hydraulic circuit comprising:

a primary hydraulic unit mounted on a primary transmission casing and housing a plurality of control valves for variation pressure supply for respective friction elements and a subsidiary hydraulic unit mounted on a subsidiary transmission casing and including a pressure accumulator, a flow restriction orifice and an one-way check valve.

The pressure accumulator may be connected to a fluid path connecting the friction element in the subsidiary transmission unit to the primary hydraulic unit via the flow restriction orifice and the one-way check valve. The subsidiary transmission unit may have the gear element for establishing under-drive speed ratio lower than a first speed ratio to be established by the gear elements in the primary transmission unit, and the subsidiary transmission unit including a direct clutch directly connected to the primary hydraulic unit via a first fluid path and a reduction clutch connected to the primary hydraulic unit via a second fluid path, and the pressure accumulator being connected to the second fluid path via the flow restriction orifice and the one-way check valve.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 4 is a chart showing active components in the automatic power transmission of FIG. 1, which components are associated to the train of power for establishing respective speed ratios;

DESCRIPTION OF THE PREFERRED EMBODIMENT

Figure 1:
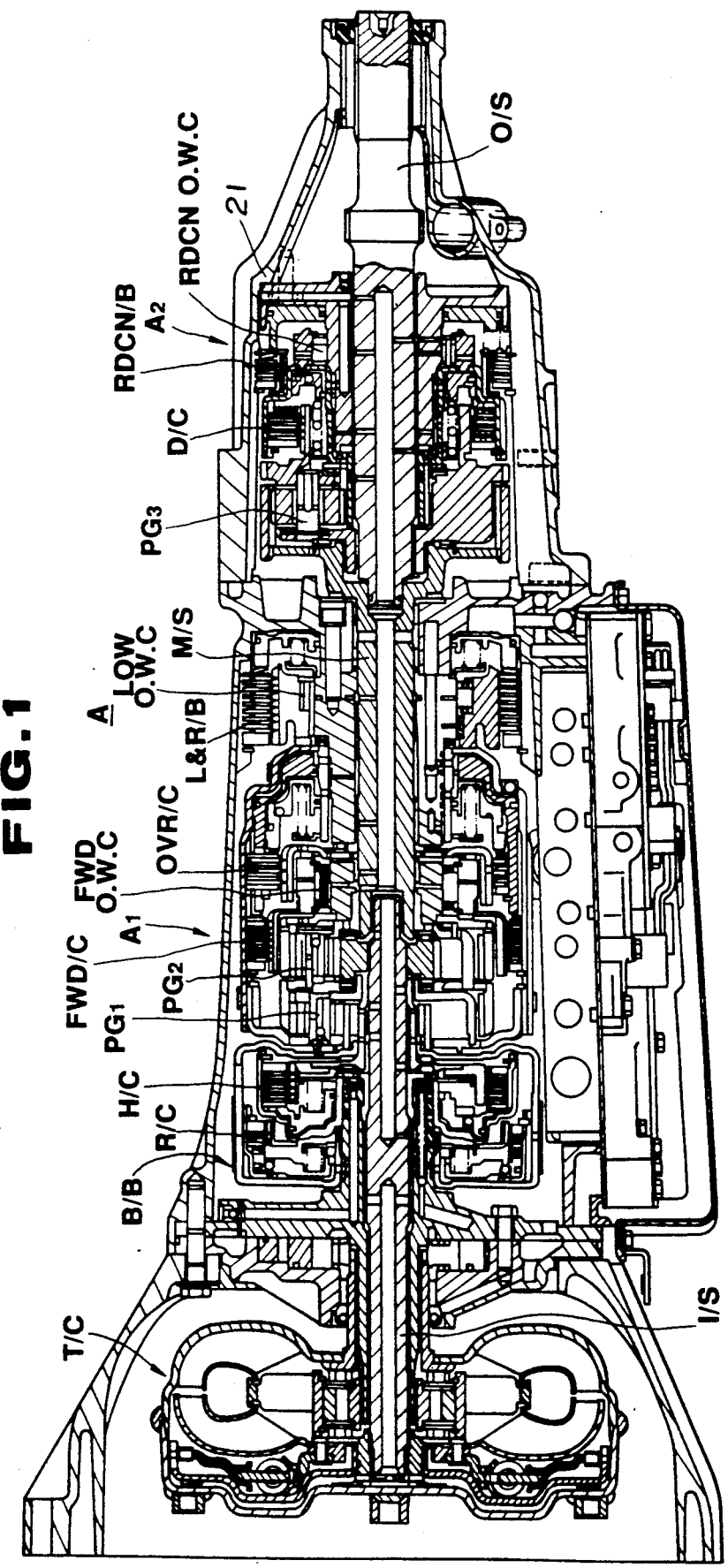
FIG. 1 is a section of the preferred embodiment of a power transmission according to the present invention, which employs primary and subsidiary transmission units for providing capability of selecting of transmission speed ratio over five forward
Figure 2:
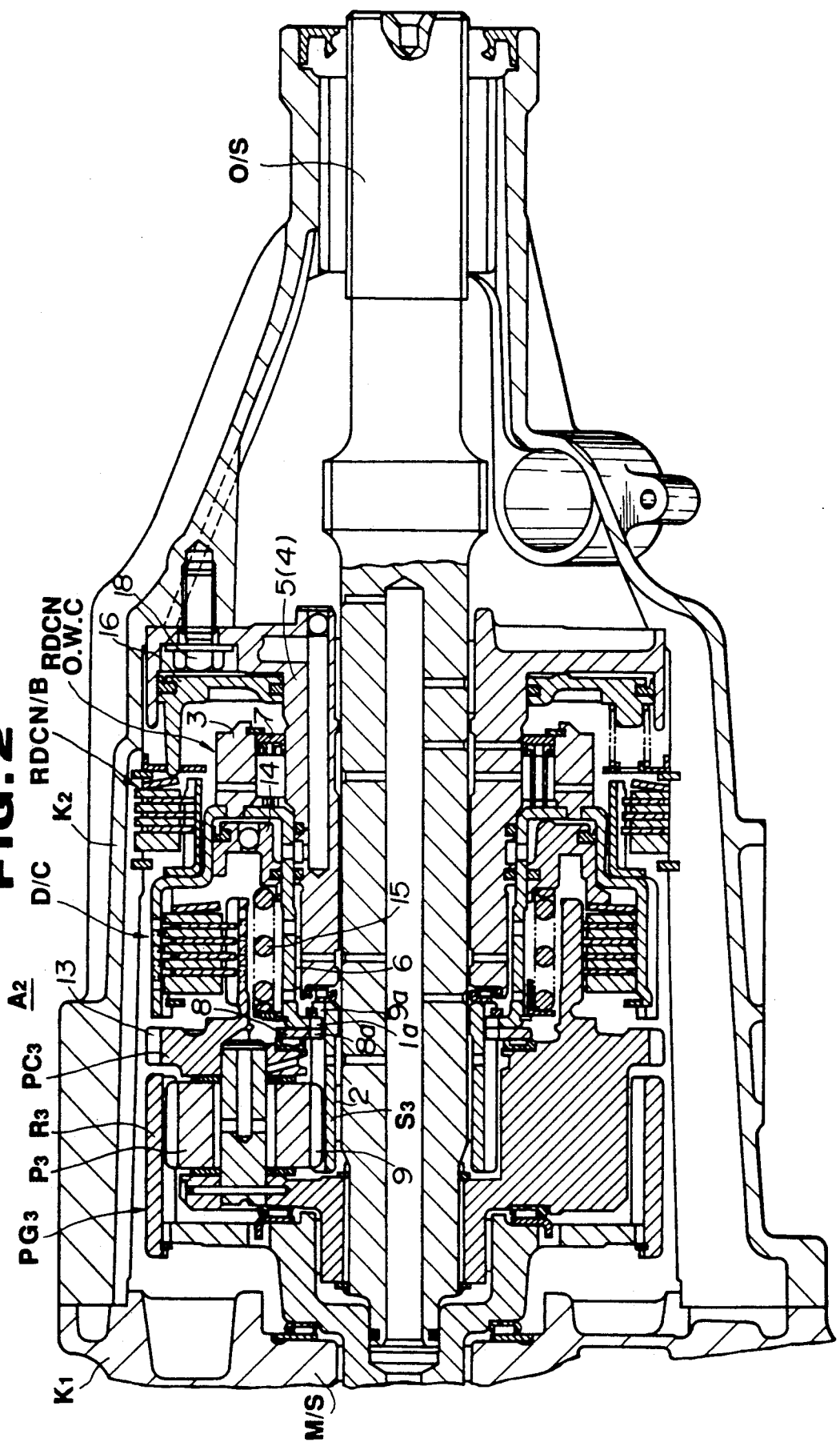
FIG. 2 is an enlarged section of the subsidiary transmission unit in the preferred embodiment of the power transmission.
Figure 3:
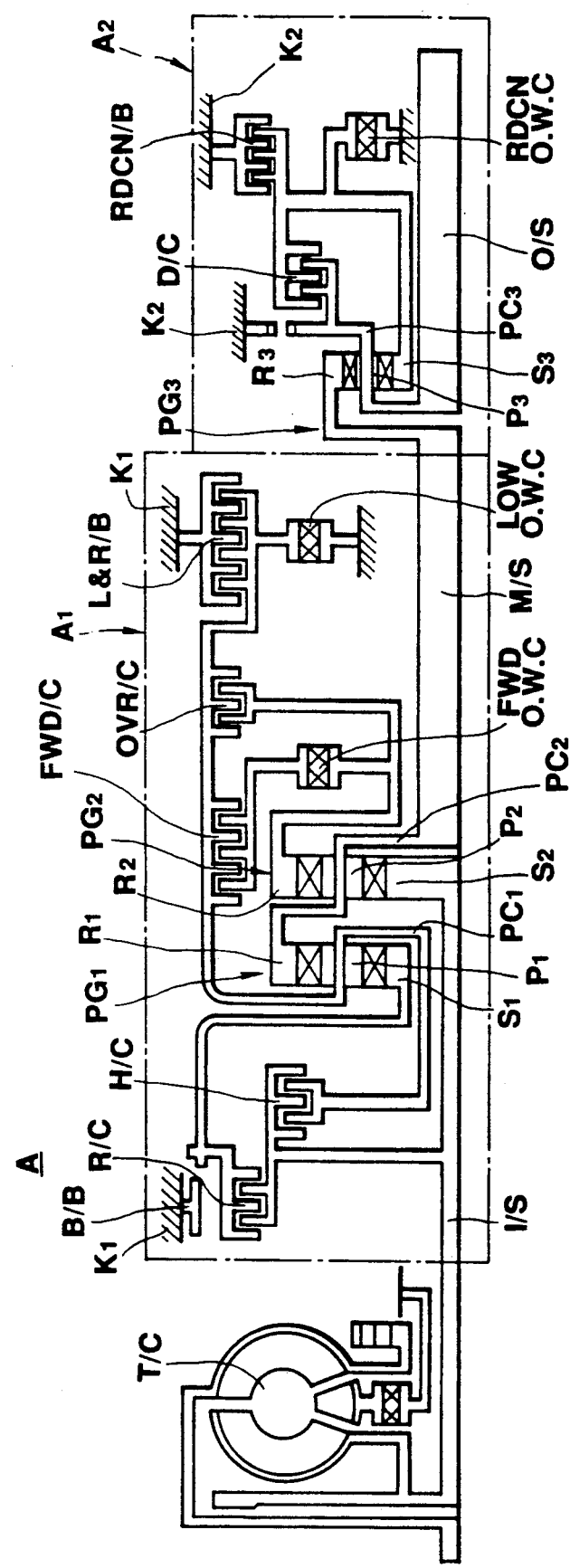
FIG. 3 is a skelton diagram of the preferred embodiment of the power transmission of FIG. 1.

Referring now to the drawings, particularly to FIGS. 1 through 3, the preferred embodiment of an automatic power transmission for an automotive power train, according to the present invention, is designed for establishing five forward drive speed ratios and a single reverse drive gear ratio. The shown embodiment of the power transmission will be represented by the reference sign "A". The automatic power transmission A includes a primary transmission unit $A_1$ and a subsidiary transmission unit $A_2$. The primary transmission unit $A_1$ provides capability of selection of speed ratio for first to fourth forward drive speed ratio. On the other hand the subsidiary transmission unit $A_2$ provides under-drive and a direct drive.

The automatic power transmission in the shown embodiment, includes a torque converter T/C associated with an output shaft of an internal combustion engine via an input shaft I/S. The torque converter T/C includes a lock-up mechanism for establishing lock-up. The torque converter T/C is housed within a converter casing which is rigidly secured to a casing $K_1$ of the primary transmission unit $A_1$. Also, the subsidiary transmission unit $A_2$ has a casing $K_2$ connected to the primary transmission casing $K_1$ in alignment.

As shown in FIGS. 1 and 3, the primary transmission unit housed within the primary transmission casing $K_1$ includes an input or turbine shaft I/S connected to the output shaft of an automotive internal combustion engine as a prime mover, via a torque converter T/C. The primary transmission unit $A_1$ also includes an intermediate shaft M/S for transmitting driving torque to a final drive. The torque converter T/C has a pump impeller, a turbine runner and a stator. The pump impeller is connected to the engine output shaft. On the other hand, the turbine runner is connected to the input shaft I/S. The pump impeller is also connected to an oil pump for driving the latter. Between the input shaft I/S and the intermediate shaft M/S, a first planetary gear set $PG_1$, a second planetary gear set $PG_2$, a reverse clutch R/C, a high clutch H/C, a forward clutch F/C, an overrun clutch OVR/C, a low-and-reverse brake L&R/B, a band brake B/B, a low one-way clutch LOW O.W.C and a forward one-way clutch FWD O.W.C. The torque converter incorporates a lock-up clutch. On the other hand, the first planetary gear set $PG_1$ includes a sun gear $S_1$, a ring gear $R_1$, pinions $P_1$ and a carrier $PC_1$ supporting the pinions. The second planetary gear set $PG_2$ includes a sun gear $S_2$, a ring gear $R_2$, pinions $P_2$ and a carrier $PC_2$ supporting the pinions.

The carrier $PC_1$ supporting the pinions $P_1$ is so designed as to be connectively associated with the input shaft I/S via a high clutch H/C. The carrier $PC_1$ is also connected to the ring gear $R_2$ of the second planetary gear set $PG_2$ via a forward clutch F/C and a forward one-way clutch FWD O.W.C. which is coupled with the forward clutch in series, or in the alternative, via the forward clutch F/C and a overrun clutch OVR/C which is provided in parallel to the forward one-way clutch FWD O.W.C. The carrier $PC_1$ is adapted to be anchored by a low and reverse brake L&R/B and its reverse rotation is prevented by the low one-way clutch LOW O.W.C. The sun gear $S_1$ of the first planetary gear set 15 is so designed as to be connectively associated with the input shaft I/S via a reverse clutch R/C. The sun gear $S_2$ of the second planetary gear set $PG_2$ is constantly connected to the input shaft I/S. The ring gear $R_1$ of the first planetary gear set $PG_1$ and the carrier $PC_2$ of the second planetary gear set $PG_2$ are constantly connected to the intermediate shaft M/S. The ring gear $R_1$ is integrally connected with the carrier $PC_2$ of the second planetary gear set $PG_2$. The sun gear $S_2$ of the second planetary gear set $PG_2$ connected to the input shaft I/S. The ring gear $R_2$ is connectively associated with the carrier $PC_1$ via the overrun clutch OVR/C. In order to establish a predetermined drive relation, the forward one-way clutch FWD O.W.C and the forward clutch F/C are arranged between the carrier $PC_1$ and the ring gear $R_2$ of the second planetary gear set 16. Engagement of the forward clutch F/C causes the forward one-way clutch FWD O.W.C. to connect the ring gear $R_2$ with the carrier $PC_1$ in the reverse rotational direction.

A low and reverse brake L&R/B can fix the carrier $PC_1$. On the other hand, a band brake B/B can fix the sun gear $S_1$. A low one-way clutch LOW O.W.C. permits rotation of the carrier $PC_1$ in a forward direction (same direction to the rotating direction of the engine intermediate shaft M/S and prevents the carrier $PC_1$ from rotating in reverse direction (opposite) to the rotating direction in forward direction).

On the other hand, as shown in FIGS. 1 and 2, the subsidiary transmission unit $A_2$ includes a third planetary gear set $PG_3$ which includes a sun gear $S_3$, a ring gear $R_3$, pinions $P_3$ and a pinion carrier $PC_3$. The third planetary gear set $PG_3$ of the subsidiary transmission unit $A_2$ is housed within the subsidiary transmission casing $K_2$. A direct clutch D/C, a reduction brake RDCN/B and a reduction one-way clutch RDCN O.W.C. are also housed within the subsidiary transmission casing $K_2$. The reduction brake RDCN/B is arranged in parallel relationship with the reduction one-way clutch RDCN O.W.C. The ring gear $R_3$ is rigidly connected to the intermediate shaft M/S for co-rotation therewith. On the other hand, the sun gear $S_3$ is radially supported on an output shaft O/S via a sun gear bearing 2. The sun gear $S_3$ is associated with the reduction brake RDCN/B so that it can be locked on the subsidiary transmission casing $K_2$ when the latter is applied. The sun gear $S_3$ is connectable with the pinion carrier $PC_1$ via the direct clutch D/C which has a clutch drum 1 provided for co-rotation with the sun gear $S_3$. The clutch drum 1 of the direct clutch D/C is associated with the reduction brake RDCN/B for locking the sun gear $S_3$ onto the subsidiary transmission casing. On the other hand, the sun gear $S_3$ is associated with the reduction one-way clutch RDCN O.W.C. for rotation in forward direction only.

The reduction one-way clutch RDCN O.W.C. has an other race 3 rigidly fixed to the clutch drum 1 of the direct clutch D/C. On the other hand, the inner race 4 of the reduction one-way clutch RDCN O.W.C. is integrally formed with a support 5. The end portion of the clutch drum 1, which end portion is oriented in the vicinity of the sun gear $S_3$, is supported by means of a drum bearing 6. On the other hand, the free end of the outer race 3 is supported by means of an end bearing 7. The clutch drum 1 has the end bent radially inward and formed with spline section 1a. An attachment plate 8 is secured on the radially extended section of the clutch drum 1. The attachment plate 8 has the splined radial inner end 8a.

The sun gear $S_3$ has a helical gear teeth 9 with a spline section 9a which is formed integrally with the helical gear teeth. Both of the splined radial inner ends 1a and 8a engage with the spline section 9a with a play in axial and radial directions.

In FIG. 2, 13 denotes a parking gear integrally formed with the pinion carrier $PC_3$, 14 is a clutch piston, 15 denotes a return spring, 16 denotes a brake piston, 17 denotes a return spring, 18 denotes a bolt for securing the support 5 onto the subsidiary transmission casing $K_2$.

In the subsidiary transmission unit $A_2$, the rotary elements which are required to be supported by bearings are the sun gear $S_3$, the clutch drum 1 and the reduction one-way clutch RDCN O.W.C. As set forth, the outer race 3 of the reduction one-way clutch RDCN O.W.C. is rigidly secured to the clutch drum 1, and the inner race of the reduction one-way clutch RDCN O.W.C. is secured to the support 5 attached to the subsidiary transmission casing $K_2$. Therefore, the clutch drum 1 associated with the outer race 3 can be supported with respect to the support 5. Also, centering of the reduction one-way clutch RDCN O.W.C. can be done with respect to one side. Therefore, the reduction one-way clutch RDCN O.W.C. also can be supported at one side. Therefore, in the shown construction, the bearings 6 and 7 can perform equivalent supporting performance to a pair of bearings required for the clutch drum and a pair of end bearings required for centering the outer race of the reduction one-way clutch in the prior art.

In addition, since the play in radial and axial direction is provided between the spline section $9a$ axially extending from the sun gear $S_3$ and the spline section $1a$ of the clutch drum 1 of the clutch drum 1, radial direction force may not act on the interengaging spline sections when the engine output power is transmitted therethrough. Therefore, sun gear $S_3$ can be supported by means of a sole bearing 2. Furthermore, since the sun gear $S_3$ is independent of the clutch drum 1 and the reduction one-way clutch RDCN O.W.C., accuracy required in assembling and machining the clutch drum 1 and the reduction one-way clutch RDCN O.W.C. becomes lower.

The power train as set forth above is selectable of power transmission mode by combination of the states of one or more friction elements, i.e. the reverse clutch R/C, the high clutch H/C, forward clutch F/C, the overrun clutch OVR/C, the low and reverse brake L&R/B and the band brake B/B, to establish various mode of operation of the components of $S_1$, $S_2$, $S_3$, $R_1$, $R_2$, $R_3$, $PC_1$, $PC_2$ and $PC_3$ of the first, second and third planetary gear sets $PG_1$, $PG_2$ and $PG_3$. With various mode of operation of the components of the first, second and third planetary gear sets $PG_1$, $PG_2$ and $PG_3$, rotation speed at the intermediate shaft M/S versus the rotation speed at the input shaft I/S is varied at various rates. Active components at respective operational modes of the transmission are illustrated in FIG. 4. By combination of the gear ratios, of the main and subsidiary transmission units the ratio of rotation of the output shaft O/S versus the rotation speed of the input shaft I/S is determined.

Figure 5:
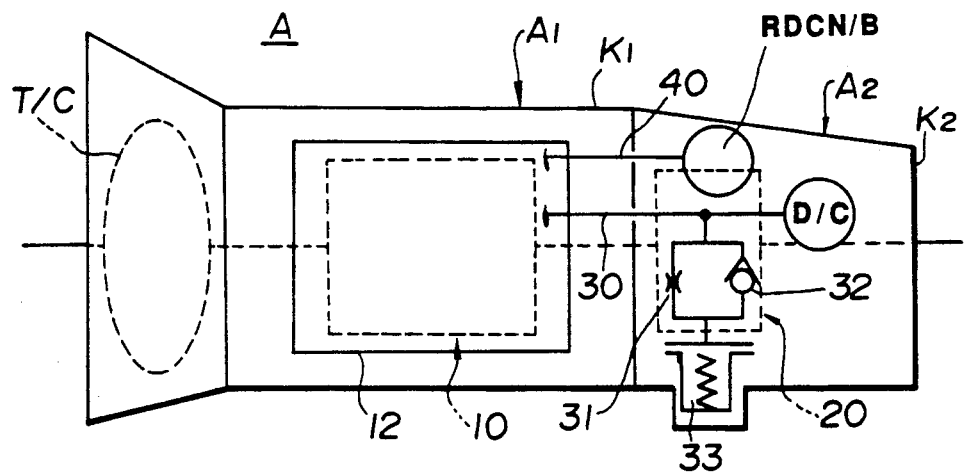
FIG. 5 is diagrammatical front elevation of the preferred embodiment of the automatic power transmission according to the present invention.
Figure 6:
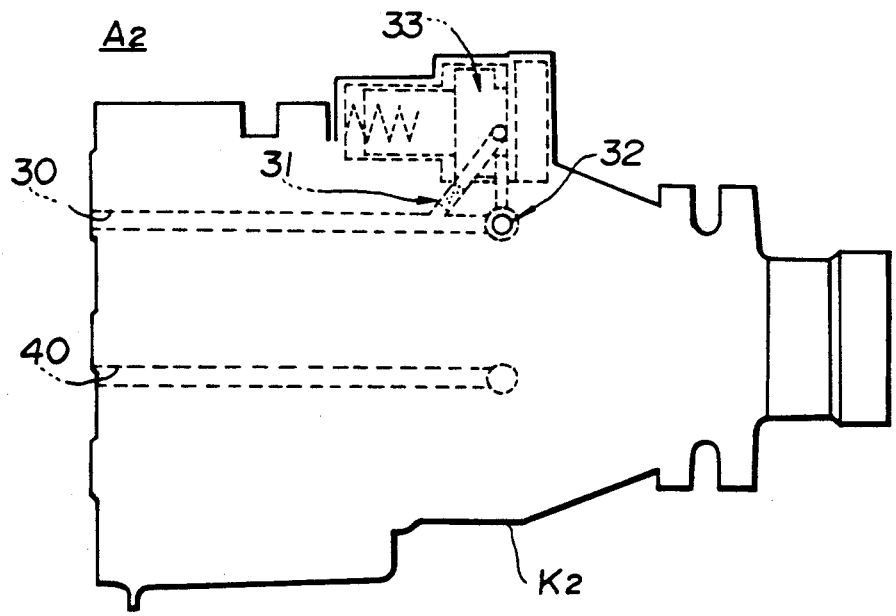
FIG. 6 is a diagrammatical and enlarged front elevation of the subsidiary transmission unit of FIG. 2.

As shown in FIGS. 5 and 6, a hydraulic unit 10 is mounted on the primary transmission casing $K_1$. The hydraulic unit 10 on the primary transmission casing $K_1$ forms a primary hydraulic control unit 12. On the other hand, the hydraulic unit 10 is connected to the reduction brake RDCN/B and the direct clutch D/C for supplying control pressure. For a control line 30 for supplying the control pressure to the direct clutch D/C, a pressure accumulator 33 is provided. The pressure accumulator 33 is connected to the control line 30 via a flow restriction orifice 31 and an one-way check valve 32. The pressure accumulator 33, the flow restriction orifice 31 and the one-way check valve 32 form a subsidiary hydraulic control unit 20. As can be seen from FIGS. 5 and 6, the subsidiary hydraulic control unit 20 is mounted on the subsidiary transmission casing $K_2$. On the other hand, the reduction brake RDCN/B is directly connected to the primary hydraulic control unit 12 for receiving the control pressure therefrom.

Figure 7:
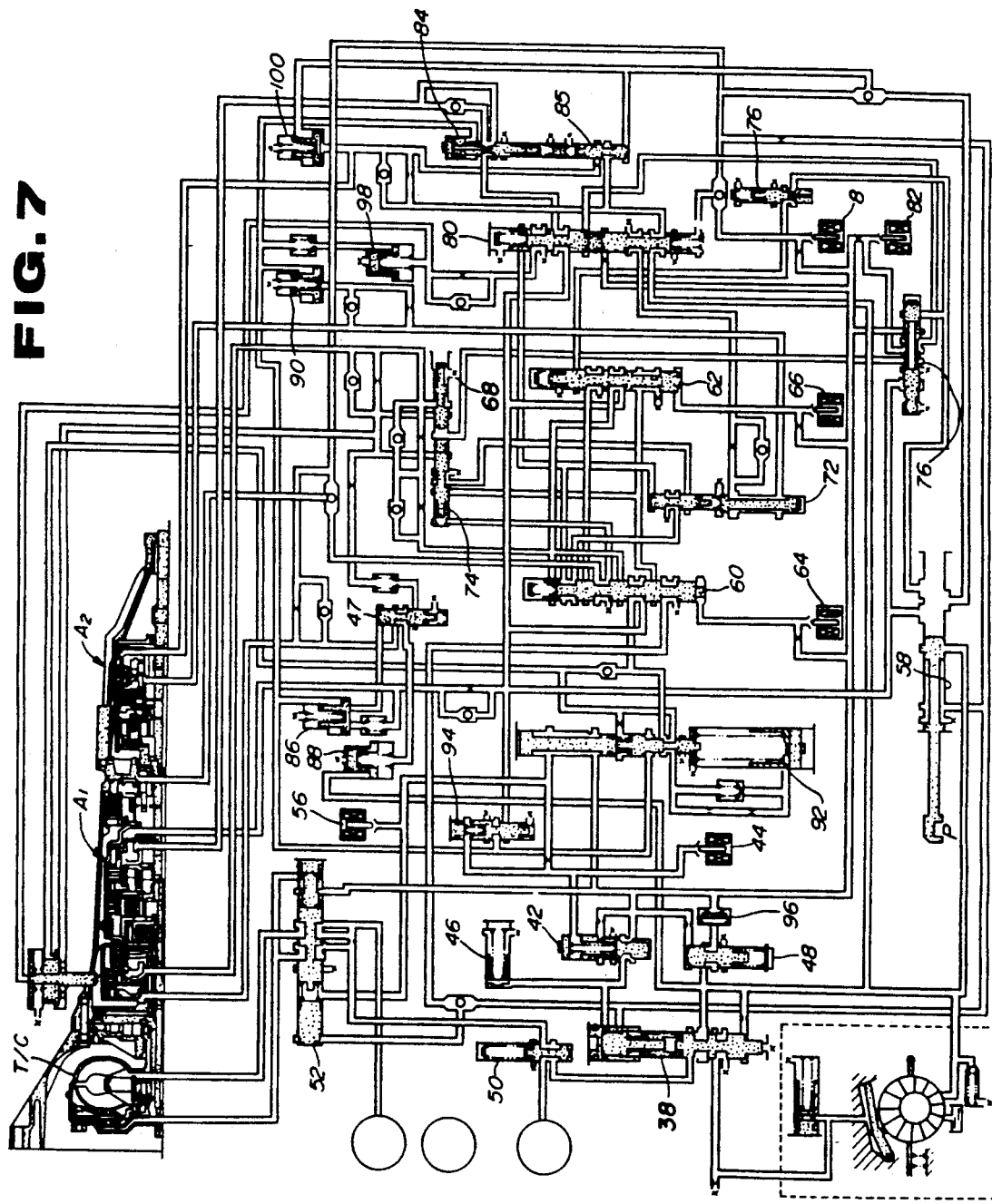
FIG. 7 is a diagram showing a hydraulic shift control unit in the preferred embodiment of the automatic power transmission according to the present invention.

The hydraulic system in the primary and subsidiary hydraulic control units 12 and 20 of the shown automatic power transmission, as shown in FIG. 7, is provided with hydraulic pressure controlling operation of respective friction elements. The hydraulic system includes a pressure regulator valve 38; a pressure modifier valve 42, a line pressure solenoid 44, a modifier pressure accumulator valve 46, an accumulator shift valve 47, a pilot valve 48, a torque converter relief valve 50, a lock-up control valve 52, a lock-up solenoid 56, a manual selector valve 58, a first shift valve 60, a second shift valve 62, a first shift solenoid 64, a second shift solenoid 66, a 3-2 timing valve 68, a 5-2 relay valve 72, a 5-2 sequence valve 74, a first range reducing valve 76, a shuttle shift valve 78, an overrun clutch control valve 80, an overrun clutch solenoid 82, an overrun clutch reducing valve 84, a reducing timing valve 85, a N-D accumulator 86, a 2-3 accumulator 88, a 3-4 accumulator 90, 1-2 accumulator valve and piston 92, an accumulator control valve 94 and a strainer 96. These shift control components in the hydraulic circuit are essentially the same or similar construction and perform essentially the same or similar function as that done by the components in an automatic power transmission known as NISSAN Full-Range Automatic Power Transmission Type RE4R01A. The construction of the hydraulic circuits and function of circuit components have been disclosed in the U.S. Pat. No. 4,680,992, issued on July 21, 1987, to Hayasaki et al. and from "Nissan Full-Range Electronically Controlled Automatic Transmission Service Manual", published by Nissan Motor Co., Ltd., on March, 1987. The disclosure of the above-identified publications are herein in incorporated for the sake of disclosure. Furthermore, Japanese Patent First (unexamined) Publication (Tokkal) Showa 62-62047 also discloses the hydraulic circuit similiar to that illustrated in FIG. 3. The disclosure of this Japanese publication is herein incorporated by reference for the sake of disclosure.

In addition to the components set forth above, a 4-5 accumulator 98 and a reduction brake accumulator 100 are provided. The shown circuit structure has been somewhat modified from that disclosed in the above-identified publication in some aspect. The modified hydraulic circuit has been disclosed in Service Manual No. 626 (YA1-3, YA1B) "NISSAN CEDRIC, GLORIA, Introduction to Modification of Y31 type series" pages C-22 to C-35, issued in June, 1989, by Nissan Motor Co., Ltd. The disclosure of this publication is herein incorporated by reference for the sake of disclosure.

The pressure regulator valve 40 adjusts a line pressure by modulating the source pressure from the oil pump depending upon a driving condition. The pressure modifier valve 42 serves for assisting the pressure regulator valve 40 and adjusts signal pressure (modifier pressure) for providing adjusting line pressure depending upon the driving condition. The modifier accumulator valve 46 removes pulsation of the line pressure by smoothing the pressure modifier pressure supplied from the pressure modifier valve 42. The pilot valve 48 produces a pilot pressure for controlling line pressure, lock-up of torque converter, overrun clutch, 3-2 timing valve and so forth. The accumulator control valve 94 controls back pressure according to the driving condition. The manual selector valve 58 is associated with a manually operable selector lever and shiftable according to selector lever position for selectively distributing the line pressure for corresponding friction elements set forth above. The first and second shift valves 60 and 62 are associated with the first shift solenoid 64 for simultaneously switching connection of three lines for controlling shifting operation between first, second, third and fourth speed ratios. The second chamber and a fourth speed servo apply chamber. With this construction, when second speed pressure is supplied to the second speed servo apply chamber, the band brake (B/B) 28 is applied; when the third speed pressure is supplied to the third speed servo release chamber, the band brake is released; and when the fourth speed pressure is supplied to the fourth speed servo apply chamber, the band brake is applied.

In the shown construction, an apply chamber and a release chamber are defined in the torque converter T/C in order to control the state of the lock-up clutch. Namely, when the fluid pressure is supplied to the release chamber, the lock-up clutch is released and when the fluid pressure is supplied to the apply chamber, lock-up clutch is engaged for establishing lock-up condition. The band brake B/B defines a second speed servo apply chamber, a third speed servo release chamber and a fourth speed servo apply chamber. With this construction, when second speed pressure is supplied to the second speed servo apply chamber, the band brake B/B is applied; when the third speed pressure is supplied to the third speed servo release chamber, the band brake is released; and when the fourth speed pressure is supplied to the fourth speed servo apply chamber, the band brake is applied.

Figure 8:
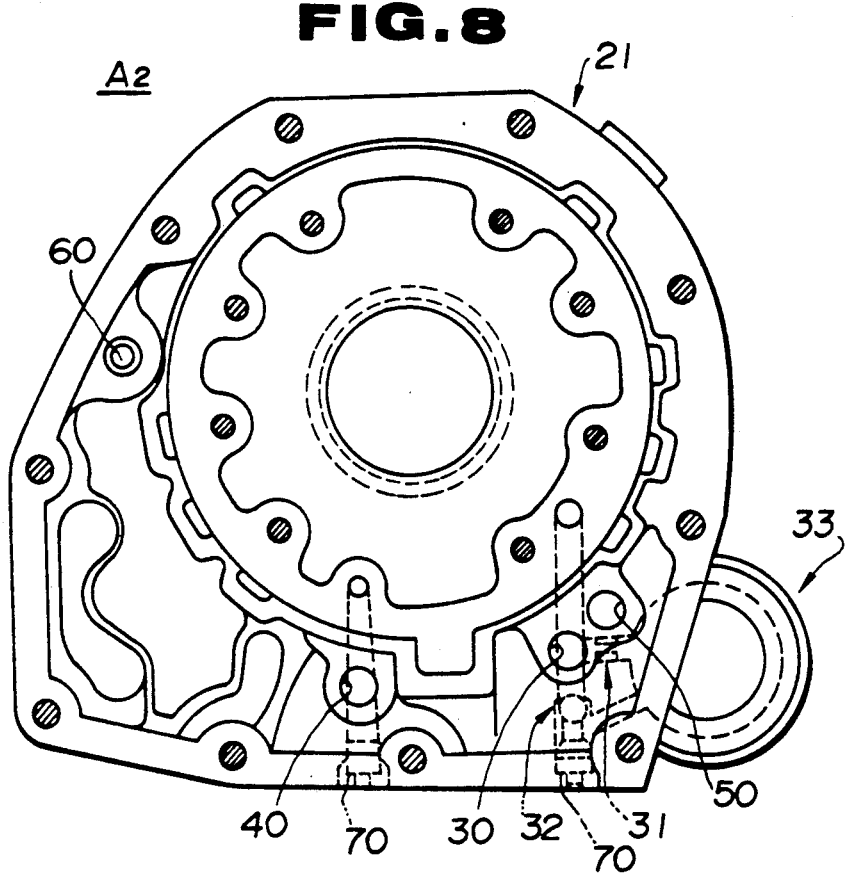
FIG. 8 is a side elevation of the subsidiary transmission unit of FIG. 2.
Figure 9:
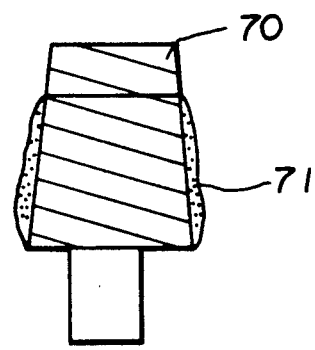
FIG. 9 is an illustration of a screw plug employed in the subsidiary transmission unit of FIG. 2.

FIG. 8 shows side elevation of the subsidiary transmission casing employed in the shown embodiment of the automatic power transmission according to the present invention. In FIG. 8, the reference numeral 50 denotes a drain path, the reference numeral 60 denotes a parking pawl rod, the reference numeral 70 denotes a plug for blocking opening. The plug 70 is formed into a configuration as illustrated in FIG. 9. As can be seen from FIG. 9, sealing layer 71 is provided at a threaded portion 70a offsetting from the front end in a magnitude corresponding to two or three turns of thread. Such manner of forming of the sealing layer 71 may improve workability in assembling operation because it makes easy to conduct an initial set of the plug to the associated opening.

With the shown construction, since the flow restriction orifice and the one-way check valve are provided in the subsidiary hydraulic control unit 20, it becomes unnecessary to form through the interface between the primary and subsidiary transmission casing a fluid path for connecting the pressure accumulator to the flow restriction orifice and the one-way check valve. This can simplify the construction of the primary and the subsidiary transmission casing. Furthermore, because the shown embodiment of the automatic power transmission does not require the fluid path formed through the primary and subsidiary transmission casing a common casing can be used for the primary transmission unit and the subsidiary transmission unit.

In assembling of the subsidiary transmission unit to the primary transmission unit, the control line 30 for the direct clutch D/C, a brake pressure path 40 for the reduction brake RDCN/B and the drain path 50 in the subsidiary transmission casing $K_2$ are aligned to the corresponding path in the primary transmission casing $K_1$. This makes installation of the subsidiary transmission casing to the primary transmission casing $K_1$ easier.

When the direct clutch D/C is to be engaged, the line pressure as the direct clutch control pressure is supplied through the control line 30. Until the control pressure overcomes the set pressure of a set spring of the pressure accumulator 33, the pressure accumulator starts accumulation of the fluid pressure. By this, the pressure increasing rate at the direct clutch D/C is reduced for eliminating shock in engagement of the direct clutch. Furthermore, when the pressure accumulator 33 saturates, the control pressure to be supplied to the direct clutch D/C is increased at greater rate. This successfully prevents the direct clutch D/C from slipping. On the other hand, when the direct clutch is to be released, the pressure accumulator 33 is effective for lowering of pressure drop in the control line in a pressure range lower than the saturation pressure and set pressure. This will successfully suppress down-shifting shock which is otherwise caused by the reduction one-way clutch RDCN O.W.C.

With the shown construction of the hydraulic circuit, the transmission can be operated to various range positions as illustrated in FIG. 4.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to the supporting structure of the sun gear and other elements in the subsidiary transmission, the similar construction may be applicable for supporting sun gear and associated elements in the over-drive mechanism (4th range) of the primary transmission. Furthermore, the similar supporting structure may be applicable for a laterally mounted type transmission which has parallel shafts.

What is claimed is:

1. In an automatic power transmission:
   a primary transmission casing having mounted thereon a hydraulic control unit; and
   a subsidiary transmission casing connected to said primary transmission casing, said subsidiary transmission casing having housed therein a predetermined friction element and having a control line having one end communicating always with said predetermined friction element and an opposite end connected to said hydraulic control unit for transmitting a control pressure from said primary hydraulic control unit to said predetermined friction element;
   said subsidiary transmission casing having an accumulator, a flow restriction orifice having one end communicating with said control line and an opposite end communicating with said accumulator, and an one-way check valve having one end communicating with said control line and an opposite end communicating with said accumulator, said one-way check valve being so constructed and arranged as to allow an uninterrupted fluid flow from said control line to said accumulator.

2. An automatic power transmission as set forth in claim 1, wherein said predetermined friction element is a direct clutch.

3. In an automatic power transmission:
a primary transmission casing having mounted thereon a hydraulic control unit; and
a subsidiary transmission casing connected to said primary transmission casing, said subsidiary transmission casing having housed therein a planetary gear set including a sun gear, a ring gear, and a pinion carrier rotatably carrying pinions meshing with said ring and sun gears, a direct clutch means for locking said planetary gear set for unitary rotation, said subsidiary transmission casing having a control line having one end communicating always with said direct clutch means and an opposite end connected to said hydraulic control unit for transmitting a control pressure from said hydraulic control unit to said direct clutch means;

said subsidiary transmission casing having an accumulator, a flow restriction orifice having one end communicating with said control line and an opposite end communicating with said accumulator, and a one-way check valve having one end communicating with said control line and an opposite end communicating with said accumulator, said one-way check valve being so constructed and arranged as to allow an uninterrupted fluid flow from said control line to said accumulator.

4. An automatic power transmission as set forth in claim 3, wherein said subsidiary transmission casing having housed therein a reduction brake means for anchoring said sun gear, and having a second control line having one end communicating always with said reduction brake means and an opposite end connected to said hydraulic control unit for transmitting a control pressure from said hydraulic control unit to said reduction brake means.

* * * * *